(12) United States Patent
Gotter et al.

(10) Patent No.: US 10,533,510 B2
(45) Date of Patent: Jan. 14, 2020

(54) MODEL-BASED CYLINDER CHARGE DETECTION FOR AN INTERNAL COMBUSTION ENGINE

(71) Applicants: FEV GMBH, Aachen (DE); HYUNDAI KEFICO CORPORATION, Gumpo-si, Gyeonggi-Do (KR); HYUNDAI AUTRON CO., LTD., Seongnam-si, Gyeonggi-Do (KR)

(72) Inventors: Andreas Gotter, Aachen (DE); Menno Merts, Jb Warnsveld (NL); Nuri Karaaslan, Duren (DE)

(73) Assignees: FEV GMBH, Aachen (DE); HYUNDAI KEFICO CORPORATION, Gyeonggi-do (KR); HYUNDAI AUTRON CO., LTD., Gyeonggi-do (KR)

(*) Notice: Subject to any disclaimer, the term of this patent is extended or adjusted under 35 U.S.C. 154(b) by 227 days.

(21) Appl. No.: 15/111,345

(22) PCT Filed: Jan. 19, 2015

(86) PCT No.: PCT/EP2015/050897
§ 371 (c)(1),
(2) Date: Jul. 13, 2016

(87) PCT Pub. No.: WO2015/107198
PCT Pub. Date: Jul. 23, 2015

(65) Prior Publication Data
US 2016/0341140 A1 Nov. 24, 2016

(30) Foreign Application Priority Data
Jan. 17, 2014 (DE) .......................... 10 2014 000 397

(51) Int. Cl.
*F02D 41/14* (2006.01)
*F02D 41/18* (2006.01)
(Continued)

(52) U.S. Cl.
CPC ..... *F02D 41/1405* (2013.01); *F02D 13/0207* (2013.01); *F02D 41/0002* (2013.01);
(Continued)

(58) Field of Classification Search
CPC ... F02D 41/14–1443; F02D 2200/0406; F02D 2200/0408; F02D 2200/063;
(Continued)

(56) References Cited

U.S. PATENT DOCUMENTS 5,954,783 A 9/1999 Yamaguchi et al.
5,974,870 A 11/1999 Treinies et al.
(Continued)

FOREIGN PATENT DOCUMENTS

DE 4421950 A1 6/1995
DE 19547496 A1 7/1997
(Continued)

OTHER PUBLICATIONS

International Search Report and Written Opinion, 11 pages, dated Apr. 7, 2015, International Application No. PCT/EP2015/050897, filed Jan. 19, 2015.
(Continued)

*Primary Examiner* — Erick R Solis
*Assistant Examiner* — Robert A Werner
(74) *Attorney, Agent, or Firm* — Dinsmore & Shohl LLP

(57) ABSTRACT

A method for a model-based determination of a cylinder charge of a combustion chamber of an internal combustion engine as well as an internal combustion engine in a computer program product. The method utilizes a neuronal network having at least three input values. A pressure quotient is used as one of the input values. The pressure quotient is determined as the ratio of the pressure of the air set by the engine over the operating pressure of the engine. The pressure of the air set by the internal combustion engine
(Continued)

may be determined by utilizing a measured value, a computed value, and/or a value determined from a characteristic map. It is also possible to include a combination of these in the pressure quotient.

14 Claims, 2 Drawing Sheets

(51) Int. Cl.
*F02D 13/02* (2006.01)
*F02D 41/00* (2006.01)

(52) U.S. Cl.
CPC ........ *F02D 41/18* (2013.01); *F02D 2041/001* (2013.01); *F02D 2200/0406* (2013.01); *F02D 2200/0411* (2013.01)

(58) Field of Classification Search
CPC ......... F02D 2200/101; F02D 2200/703; F02D 2200/704; F02D 2041/001; F02D 2041/002; F02D 13/00–08
USPC ............... 73/114.16–114.22, 114.25, 114.31; 701/101, 102, 106; 123/321–322, 123/345–348, 674
See application file for complete search history.

(56) References Cited

U.S. PATENT DOCUMENTS

| | | | | |
|---|---|---|---|---|
| 6,401,457 | B1* | 6/2002 | Wang | F02B 37/18 123/568.21 |
| 7,477,980 | B2* | 1/2009 | Kraemer | F02D 41/1402 700/29 |
| 9,206,751 | B2* | 12/2015 | Herold | F02D 41/0007 |
| 9,217,362 | B2* | 12/2015 | Wang | F02B 37/013 |
| 9,297,330 | B2* | 3/2016 | Svensson | F02D 41/38 |
| 2002/0107630 | A1 | 8/2002 | Yagi | |
| 2009/0018748 | A1* | 1/2009 | Muller | F02D 41/1448 701/102 |
| 2009/0018752 | A1* | 1/2009 | Prunier | F02D 41/182 701/103 |

FOREIGN PATENT DOCUMENTS

| | | |
|---|---|---|
| DE | 19706750 A1 | 8/1998 |
| DE | 19914910 A1 | 10/2000 |
| DE | 10113538 A1 | 9/2002 |
| DE | 10224213 C1 | 10/2003 |
| DE | 10227466 A1 | 1/2004 |
| DE | 102014000397 A1 | 7/2015 |
| EP | 0877309 B1 | 6/2000 |
| EP | 1234958 A2 | 8/2002 |
| EP | 1431548 A2 | 6/2004 |
| JP | H11294230 A | 10/1999 |
| WO | 2006/024397 A1 | 3/2006 |

OTHER PUBLICATIONS

Helge Nareid Et al: "A Neural Network Based Methodology for Virtual Sensor Development", Society of Automotive Engineers Publications, XX, XX, Apr. 1, 2005, pp. 1-5, XP008080036.

* cited by examiner

MODEL-BASED CYLINDER CHARGE DETECTION FOR AN INTERNAL COMBUSTION ENGINE

CROSS-REFERENCE TO RELATED APPLICATIONS

This application is the U.S. national stage of PCT/EP2015/050897 filed Jan. 19, 2015, which claims the priority of German Patent Application 10 2014 000 397.3 filed on Jan. 17, 2014, the disclosure of which is incorporated herein by reference.

FIELD OF THE INVENTION

The present invention relates to a method for model-based determination of a cylinder charge of a combustion chamber of an internal combustion engine, an internal combustion engine and a computer program product.

BACKGROUND OF THE INVENTION

From the state of the art, a large number of models for modeling the cylinder charge of an internal combustion engine are known. The internal combustion engine which is to be modeled often comprises a fully variable valve lift, and the modeling is performed under consideration of the suction tube pressure and by a model-based approach, wherein, in the state of the art, a linear approximation of the cylinder charge on the basis of the suction tube pressure is highly inaccurate, particularly in case of supercharged engines and suction engines with high interior or exterior exhaust gas recirculation. Already known is the linear modeling in accordance with a straight line m*x+b, wherein x represents the suction tube pressure. In case of a large valve overlap, however, this approach is too inaccurate.

EP-A-1 431 548 describes a device for setting a vacuum and a valve lift for control of internal exhaust gas recirculation (EGR), wherein a differentiation is made between a cold and a warm engine for controlling the internal EGR.

WO-A-2006/024397 describes a method for model-based determination of the air mass flowing into the cylinder combustion chamber of an internal combustion engine during a suction phase. Determination of the fresh air mass flowing into the cylinder chamber during the suction phase is performed by means of various load part models wherein, at least via a first load part model with purely linear functionality, a first fresh air portion will be determined and, via a second load part model with non-linear functionality, a second fresh air portion will be determined.

EP-A-1 234 958 describes a method for control of the adjustment of the inlet phase shifter in continuous variable valve lift (CVVL) engines in accordance with the operational state and respectively the current range of the characteristic map.

DE-C-102 24 213 describes a method for charge control of an internal combustion engine. In this method, two actuators, arranged behind each other in the suction duct and each controlling the air volume flow through the suction duct, can be used in mutual attunement for charge control. Using the measurement and model values, an adjustment of the model is performed, wherein the desired positions for the two actuators are determined with the aid of a model that is inverted relative to the adjusted model. Said model comprises two part models, there being provided a first part model wherein the model value for the air volume flow is computed from the measurement value of the suction tube pressure and the actual position of the first actuator, and a second part model wherein the model value for the suction tube pressure is computed from the measurement value of the air volume flow and the actual position of the second actuator. Prior to computation of the second part model, the first part model will be adjusted, wherein an adjustment parameter is determined that will be considered in the second part model.

DE-A-102 27 466 describes a method and a device for determining the cylinder charge of an internal combustion engine. With the aid of a first air volume model, the air mass sucked in by a cylinder will be computed. This first air mass model may be based exclusively on the sensor models of the air mass actuators, such as e.g. the position of the air mass actuator and respectively the variable valve lift, or there may be additionally considered the measured pressure in the suction tube. The first air mass model will be adjusted via a second air mass model. The air mass computed in the second model is based on the mixture composition of the exhaust gas which is determined on the basis of a lambda value, and on the supplied fuel mass. In this manner, engine-individual tolerances are said to be compensated for.

DE-A-101 13 538 describes a control device and control method comprising a real-time controller with neuronal adaption for control of internal combustion engines. In said control device and respectively method, an online adaption to non-linear variation is performed. Online adaption is carried out with the aid of neuronal correction device. A network type suitable for the neuronal correction device is a LOLIMOT network.

DE-A-199 14 910 describes a hybrid model for modeling a total process in a vehicle, consisting of respectively one physical and one neuronal part model. The total process, e.g. the filling of the cylinders, will be divided into part processes which are described by various part models and then will be combined into a total model. In an internal combustion engine with variable valve lift, the base charge shall be determined via a physical model. However, the influence of a camshaft shift, i.e. the rotational offset of the camshaft relative to the crankshaft, shall be described via the neuronal network. It is said to be an advantage of DE-A-199 14 910 that, by use of a base model with physical process description, the portion of the neuronal part model can be restricted. In this manner, it shall be guaranteed that the total model will not indicate an implausible exponential behavior.

EP-B-0 877 309 describes virtual vehicle sensors based on neuronal networks which are trained by data generated through simulation models. During the training of the network, the various connections together with the appertaining weightings will be determined. With the aid of a polynomial model arranged downstream of the neuronal network, a sensor output can be generated. However, according to the description, the type of a neuronal regression model is not restricted to the use of polynomials. Because of the tendency that the interpolation of polynomials will be affected by large errors, it is preferred to select non-polynomial functions.

DE-A-197 06 750 describes a method for mix control in an internal combustion engine, and devices for performing said method. The method comprises a learning process in which both stationary and dynamic operational states will be included. In this manner, there is described a trainable mix control which compares the actually existing mix ratio to a desired value and, in case of a deviation therefrom, will adapt the stored control information to the effect that, in future passes through the same or a similar operating point, a reduced deviation will be obtained. Thus, the neuronal network is trained online.

DE-C-44 21 950 describes a device for the diagnosing and controlling of internal combustion and electric motors. Further described is the use of a neuronal network which, using measurement data of sensors, will drive a control system for controlling the motor.

DE-C-195 47 496 describes a method for control of internal combustion engines. Particularly, there is presented a method for determination of an air mass flow which is sucked by the cylinders of an internal combustion engine and which serves as a base for the metering of the fuel by a control device comprising a disturbance value monitoring unit of the non-linear type. The purpose of this monitoring approach resides in estimating the air mass flow into the cylinders by learning the volumetric efficiency of the engine with the aid of methods of artificial intelligence. To this end, use can be made e.g. of a neuronal network which initially has a large number of values that will influence the volumetric efficiency. Among these, there are a suction tube pressure, a rotary speed but also, possibly, valve control times or other parameters.

SUMMARY OF THE INVENTION

It is an object of the invention to achieve, in comparison to the various approaches known from the state of the art, a better efficiency of an internal combustion engine in a variety of applications.

The respective features indicated in the claims, the Figures and the description can be combined, in a general or special manner, with other features so as to realize modifications. Particularly, the indicated examples with their respective features should not be interpreted in a limiting sense. Instead, the features indicated in the examples can also be combined with other features taken from other examples or from the general description.

According to the invention, there is proposed a method for model-based determination of a cylinder charge within a combustion chamber of an internal combustion engine, wherein the internal combustion engine has a variable valve lift which will be considered in the model-based determination, wherein the modeling of the cylinder charge of the combustion chamber is performed by at least one neuronal network into which at least three input values will be input. The invention provides that, in the at least one neuronal network, a pressure quotient is used as one of said at least three input values, wherein the pressure quotient will at least indirectly be determined from a pressure of the air sucked by the internal combustion engine and an operating pressure. For instance, the operating pressure can be, in case of a suction engine, an ambient pressure or, in case of a supercharged engine such as e.g. a turbo engine, the pressure prevailing upstream of a throttle valve. In this manner, a high modeling accuracy can be reached.

Particularly, in this manner, there can also be considered—apart from the linear behavior of the air sucked by the internal combustion engine—the non-linear behavior of the cylinder charge. According to one embodiment, the pressure quotient can comprise the following formula:

$$\text{Pressure quotient} = \frac{\text{Pressure of the air sucked by the internal combustion engine}}{\text{Operating pressure}}$$

Apart from direct inclusion of the pressures into the pressure quotient, the pressures can also be included, individually or also together, in the pressure quotient only in an indirect manner, e.g. as a determinant amount for another pressure which, as a term, will be included in the ratio.

If the to-be-modeled internal combustion engine additionally comprises multiple variabilities, for instance a two-fold variability such as e.g. a rotary-speed-dependant, length-variable (switched) suction tube or a tumble valve in the intake system, it is possible to use e.g. a plurality—corresponding to the number of variabilities—of neuronal networks wherein, in dependence on the switching state of the multiple variability, there will be used that neuronal network which had been predated corresponding to the setting of the variability.

Preferably, as a pressure of the air sucked by the internal combustion engine, a suction tube pressure or a charging pressure will be included in the pressure quotient. When using a suction tube pressure for the computation of the pressure quotient, a throttle factor will be obtained, and when using a charging pressure of a supercharged internal combustion engine for the computation of the pressure quotient, a charging factor will be obtained. In case of an internal combustion engine operated purely in a throttled state, the throttle factor can take on a value in the range from 0 to 1 whereas, in a supercharged internal combustion engine, the charging factor can take on a value in the range from 0 to 2.5, and a value larger than 4 in case of a multi-staged charge.

According to a preferred embodiment, as a pressure of the air sucked by the internal combustion engine, there will be included a measured value, a computed value and/or a value determined from a characteristic map. It is also possible to include a combination of these, e.g. an average value, in the pressure quotient.

Preferably, an output value of the neuronal network will be multiplied by an operating pressure and then will be divided by a value characterizing a standard pressure, preferably 1013 mbar, whereby a correction of the determined cylinder charge is performed in dependence on the geographic altitude on which the internal combustion engine is located.

According to a preferred embodiment, use is made—apart from the pressure quotient—of a rotary speed of the internal combustion engine and a valve lift of the internal combustion engine as further input values of the neuronal network.

According to a preferred embodiment, a neuronal network is used which comprises at least four, or, with particular preference, five input values.

Preferably, as a further input value of the neuronal network, at least one phase of the camshaft is used, wherein this one phase can be the phase of an inlet valve camshaft and/or the phase of an outlet valve camshaft.

According to a preferred embodiment, the logarithm of the cylinder charge will be modeled. This way, the relative accuracy can be realized in case of a small cylinder charge, wherein the logarithm of the cylinder charge is modeled instead of the absolute cylinder charge. For instance, at the output of the neuronal network, an $e^x$ transformation may exist which will yield the value representing the cylinder charge. Thereby, in the whole load range, the relative error can remain constant while the absolute error of the logarithm remains constant. In the network training, it is preferred to achieve only a uniform, absolute error; however, achieving a uniform error in the network training is difficult. Thus, for a good quality of the mix, particularly with low loads, it is preferred that a maximal relative error will not be exceeded.

Preferably, in the method, the training of the at least one neuronal network is performed offline on the basis of measured and/or simulated values. For the network training, use can be made e.g. of a set comprising at least 5000 data sets including respectively the amounts of the input values, e.g., in a neuronal network having five inputs, these can be the values for the pressure quotient, the rotary speed of the internal combustion engine, the valve lift of the internal combustion engine, the inlet valve camshaft phase, the outlet valve camshaft phase and the relative cylinder charge. In the training of the neuronal network, an optimization can be effected with respect to the average error with the aid of a root mean square error RMSE. A well-trained neuronal network can have a relative RMSE value of less than 2% of the average trained charge and respectively, when using the logarithm of the cylinder charge, an absolute error less than 0.02. For assessment of the network quality, it can further be considered how uniform the generated surface of the network is. In this respect, according to one embodiment, a staircase-shaped or oscillating behavior of the trained network is not desired and will e.g. be provided with a corresponding penalty term.

According to a preferred embodiment, a multi-layer perceptron MLP comprising at least one hidden layer, is used in the topology for the neuronal network. In a first hidden layer, a number of neurons in the range between 8 and 30 can be arranged. When using an MLP comprising two hidden layers, a number of neurons in the range between 8 and 30 can exist in the first layer, and a number of neurons in the range between 3 and 15 can exist in the second layer. It has become evident that a smaller number of neurons does not allow for a sufficient model accuracy and a higher number of neurons may cause an instable behavior tending toward overfitting.

Preferably, the invention is used for control of an internal combustion engine, wherein, for correction of deviations, there is preferably performed an adaption of values used in the model-based determination, particularly of values of an output value of the neuronal network, of a lambda control, of a suction tube pressure controller and/or of an air-mass measurement device, particularly of the hot-film type. In this manner, the control of a fully variable valve lift of an internal combustion engine can be improved, wherein, in a manner depending on the control mode, a suitable and optimum setting of the valve lift and the throttle valve angle will be set and adjusted.

According to a preferred embodiment, an adaptation of the output value of the neuronal network is performed with the aid of values from an (e.g. hot-film) air-mass measurement device as soon as, both by the air-mass measurement device and the lambda control, there is respectively determined a deviation from the value of the cylinder charge determined by the neuronal network.

Preferably, an adaptation of a fuel path is performed by the lambda control as soon as, both by the air-mass measurement device and the lambda control, there is respectively determined a deviation from the value of the cylinder charge determined by the neuronal network.

According to a preferred embodiment, an adaptation of a value of an air-mass measurement device is performed with the aid of the output value of the neuronal network as soon as, by the air-mass measurement device as well as by the neuronal network as well as by the suction tube pressure controller, there is respectively determined a deviation from the value of the cylinder charge determined by the neuronal network.

Preferably, an adaptation of a modeled throttle flap mass flow is performed by the suction tube pressure controller as soon as, both by the air-mass measurement device and by the suction tube pressure controller, there is respectively determined a deviation from the value of the cylinder charge determined by the neuronal network.

According to a preferred embodiment, an output value is computed by performing a run through the neuronal network for a first time, with a pressure quotient using a measured pressure and with the rest of the input values, by performing a run through the neuronal network for a second time, with a pressure quotient using a computed pressure and with the rest of the input values, and, subsequently, performing a local linear regression between the output value of said first run and the output value of said second run. The measured and computed pressure can represent a suction tube pressure. With the aid of the linear regression, an output value can be determined. The output value can be a value of a residual gas pressure and/or a value of a charge portion in dependence on the suction tube pressure. In this manner, with the aid of the local linear computation model, values of the residual gas pressure and/or of the charge portion can be made available in dependence on the suction tube pressure of the engine control.

The invention further comprises a computer program product comprising program parts which, when loaded in an engine control, are adapted to perform a method as described above. For instance, the computer program product can also at a later time be implemented entirely or partially in a vehicle via a suitable interface and, in the vehicle, it can replace or complement an existing method. Implementation can be performed via a wired connection or also in a wireless manner.

Further, there is claimed an internal combustion engine comprising an engine control with an above described implemented method.

The invention further relates to the use of an internal combustion engine comprising an engine control including an above described implemented method in an automobile. The use of said method in an automobile for travel on roads has the advantage of achieving an improved efficiency in various driving situations. By use of intelligent systems assisting the driver, the method can also be applied to make it possible to perform dynamic processes, such as e.g. in start-stop systems, automatic braking, cruise control or operation with automatic shifting, with increased efficiency. The same holds true for autonomous driving systems.

BRIEF DESCRIPTION OF THE DRAWINGS

The invention will be explained in greater detail hereunder by way of examples and with reference to the Figures. However, these illustrated embodiments should not be interpreted as restricting the scope and the details of the invention. Instead, the features evident from the Figures are not delimited to the individual embodiments. To the contrary, these features can be combined with respective other features indicated in the Figures and/or in the description inclusive of the description of the Figures, so as to obtain modifications, not illustrated in greater detail here. The Figures show the following.

DETAILED DESCRIPTION OF THE PREFERRED EMBODIMENTS

Figure 1:
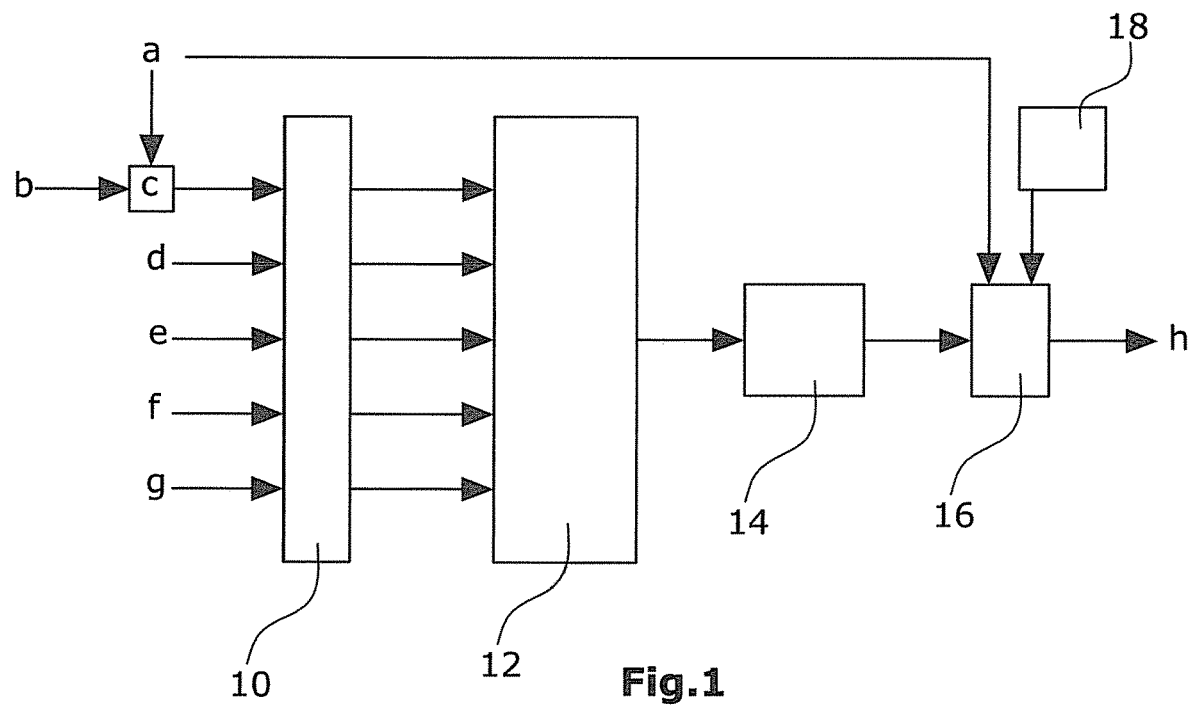
FIG. 1 an architecture of a neuronal network for cylinder charge computation, comprising five input values, FIG. 2 a circuit diagram for evaluation of model deviations and for computation of the adaptation factors, FIG. 3 a schematic diagram of a vehicle comprising an internal combustion engine and an engine control, and FIG. 4 an architecture for cylinder charge computation and for computation of an output value.

FIG. 1 illustrates, in an exemplary manner, the architecture of a neuronal network for computation of the cylinder charge, comprising five input values. The first input value is a pressure quotient c. The pressure quotient c is indirectly determined by a pressure b of the air sucked by the internal combustion engine in relation to an operation pressure a. The pressure b of the air sucked by the internal combustion engine can be included in the pressure quotient as a suction tube pressure or a charging pressure. The value of the pressure b can be a measured value, a computed value or a value from a characteristic map. The operating pressure a can be an ambient pressure and can also be measured, computed or be taken from a characteristic map. The second input value is the rotary speed d of the internal combustion engine. The third input value is the valve lift e of the internal combustion engine. The fourth input value is the inlet phase f of an inlet valve camshaft phase which is adjustable relative to a reference position. The fifth input value is the outlet phase g of an outlet valve camshaft phase which is adjustable relative to a reference position. Preferably, first, the five input values will all be normalized in a first module 10 before the five input values will enter the neuronal network 12. In the neuronal network 12, a value for an output value is computed on the basis of the normalized values of the input values. The computed value is forwarded to a logarithm or exponential transformation device 14 in order to compensate for a relative error. In a second module 16, the value determined by the logarithm and respectively exponential transformation device 14 will be multiplied by the operating pressure a and be divided by a value characterizing a standard pressure, e.g. 1013 mbar. In this manner, a correction can be performed to the geographic altitude before the modeled cylinder charge h will be determined. In FIG. 1, it is further illustrated that a temperature correction can be carried out in the second module 16. For this purpose, a value of a measurement of an (e.g. hot-film) air-mass measurement device 18, is input into the second module 16 and, on the basis of the received value, the second module 16 can perform a temperature-dependent correction before the modeled cylinder charge h will be determined.

Figure 2:
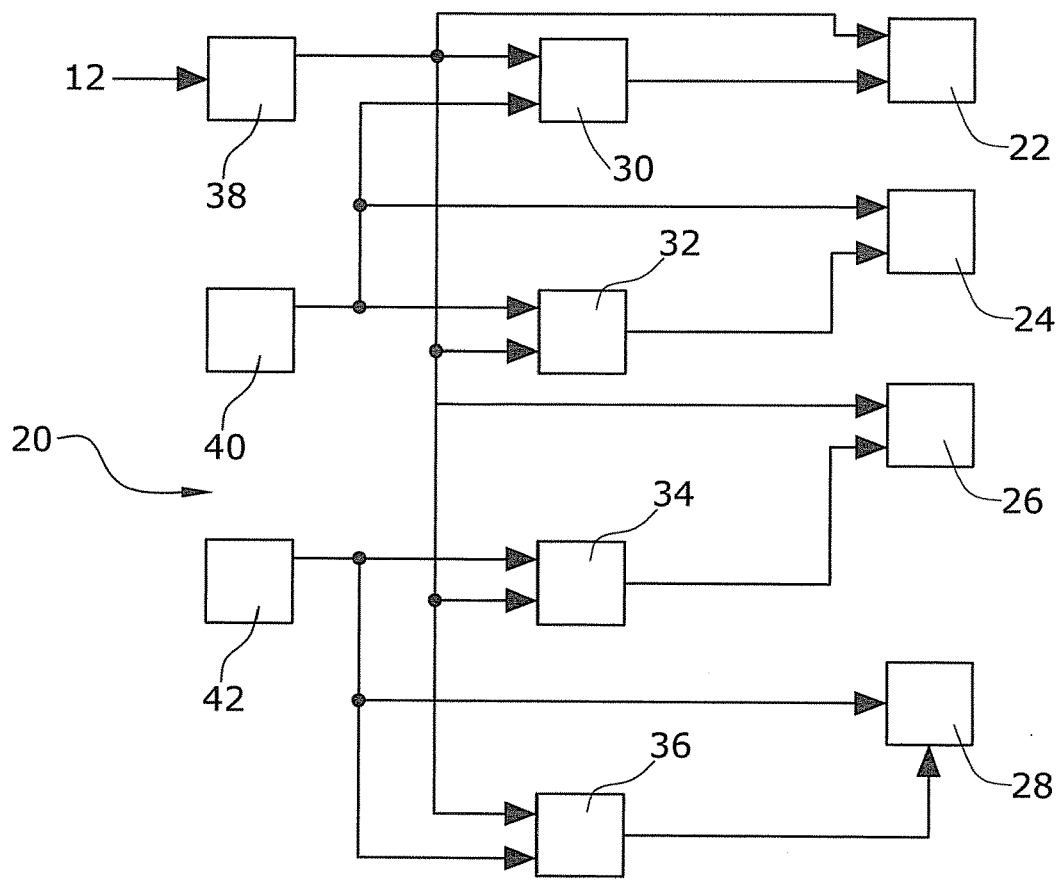

FIG. 2 shows a circuit diagram for evaluation of model deviations and a computation of the adaptation factors.

First, for explanation of the evaluation of model deviations and of the computation of the adaptation factors, the functionality of the internal combustion engine should be explained. For instance, an adjustment value will be determined is based on the position of the accelerator pedal. This is performed in dependence on the control mode of the internal combustion engine. The control mode can be e.g. one of three different valve control modes, notably "variable valve control", "throttled valve control" or "partially throttled valve control", wherein "variable control" is to be understood in the sense that the charging of the cylinder is performed for the most part by adjusting the valve lift, and "throttled" or "partially throttled" as modes are to be understood in the sense that the charging of the cylinder is performed for the most part by variation of the throttle flap.

In the control mode "variable valve control", there is set a relatively low vacuum in the suction tube relative to the ambience in order to allow for a largely unthrottled control mode. For this purpose, a vacuum, e.g. 20 mbar to 50 mbar, will be determined independently of the operating point, and will be adjusted by variation of the throttle flap. By switching the control mode, it is also possible to set a higher vacuum for special situations, e.g. for heating a catalyst and/or a particle filter.

The desired position of the valve lift in the control mode "variable valve control" is pre-controlled based on a simple characteristic map whose input value is a relative desired charge. The desired-lift characteristic map is determined during the calibrating phase in that the values of the trained neuronal network 12 for cylinder charge detection will be inverted or, with the aid of an online tool, will be iteratively approximated until the value of the characteristic map will correspond to the output value of the neuronal network 12. Thus, the characteristic map is not truly inverse relative to the neuronal network 12 because, on the one hand, the neuronal network 12 has still further input values and, on the other hand, the neuronal network 12 as such is actually not invertible.

The characteristic map is derived from the neuronal network 12 that has been trained beforehand. In this regard, it is assumed that the behavior of the neuronal network 12 will monotonously rise in dependence on the valve lift e. With the aid of a calibrating tool, the valve lift e for each rotary-speed supporting point will be increased until the next load supporting point in the characteristic map has been reached. Thus, until the full load limit is reached, a characteristic map is determined which has an inverse behavior relative to the neuronal network 12 without really being inverse in the mathematical sense. A further partial model does not exist. Possible deviations between the characteristic map and the rest of the system are compensated in a valve lift control device.

For computation of the desired pressure in the suction tube in the control modes "throttled" and "partially throttled", a current characteristic value will be read from the neuronal network 12. With this characteristic value, the suction tube pressure will be linearly extrapolated on the basis of the current operating parameters, and then the suction tube pressure will be computed.

In the circuit diagram 20 shown in FIG. 2, up to four adjustment control processes are carried out, wherein various corrections of deviations are performed by adaptation of values. For adjustment, use is made respectively of a further auxiliary value for plausibilization. Particularly, use is made of values of an output value of the neuronal network 12, of a lambda control 40, of a suction tube pressure controller 42 and/or of an air-mass measurement device 38, which are symbolically represented in the circuit diagram 20.

An adaptation of the output value of the neuronal network is performed in module 22 by means of values from an air-mass measurement device 38. This adaptation will take place as soon as a deviation going respectively in the same direction has been determined in module 30 by the air-mass measurement device 38 and the lambda control 40. Thus, the deviations of the air-mass measurement device 38 and of the lambda control 40 are identical. The deviation will be determined by a module 30.

In module 24, an adaptation of a fuel amount 24 is performed by the lambda control 40 as soon as deviation going respectively in the same direction, i.e. having the same sense, is determined by the air-mass measurement device 38 and the lambda control 40. Thus, the deviations of the air-mass measurement device 38 and of the lambda control 40 are identical. The deviation will be determined by a module 32. In this manner, a fuel amount adaptation can be designed in dependence on the control mode.

An adaptation of a value of an air-mass measurement device 38 is performed in module 26 by means of the output value of the neuronal network 12, wherein the output value of the neuronal network 12 is input as soon as a deviation going respectively in the same direction, i.e. having the same sense, is determined by the air-mass measurement device 38, the neuronal network 12 and the suction tube pressure controller 42. Thus, the deviations of the air-mass measurement device 38, the neuronal network 12 and the suction tube pressure controller 42 are identical. The deviation will be determined by a module 34.

In module 28, an adaptation of a modeled throttle-flop mass flow is performed by the suction tube pressure controller 42 as soon as a deviation going respectively in the same direction, i.e. having the same sense, is determined by the air-mass measurement device 38 and the suction tube pressure controller 42. Thus, the deviations of the air-mass measurement device 38 and the suction tube pressure controller 42 are identical. The deviation will be determined by a module 36. Achieved in this manner is an adjustment control between a measured air mass, the value of pre-controlled value throttle flap and the characteristic map of the valve lift in order to keep a difference between the measured air mass and the pre-controlled air mass as small as possible.

Figure 3:
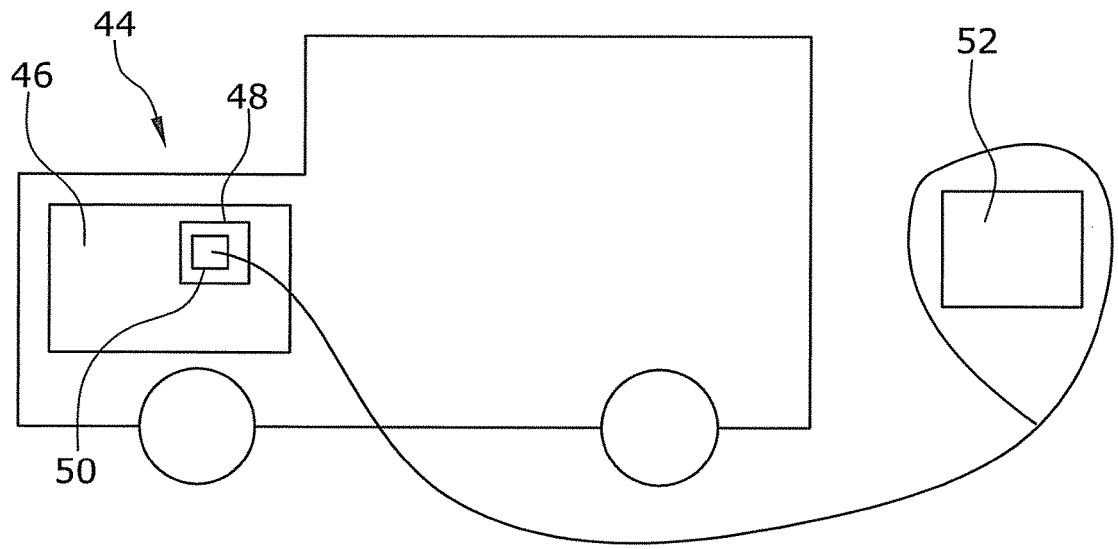

FIG. 3 shows a schematic diagram of an automobile 44. Automobile 44 comprises an internal combustion engine 46. The internal combustion engine 46 comprises an engine control 48. The engine control 48 includes a computer unit with a storage medium 50. The storage medium 50 can be e.g. a random access memory module (RAM), a read-only memory module (ROM), a CD, a DVD, a hard disk or the like. In the storage module 50, a computer program product 52 has been stored. The computer program product 52 comprises program parts which are suited to control the architecture according to FIG. 1 or which perform an evaluation of deviations from the model and a computation of adaptation factors according to the circuit diagram of FIG. 2. With the aid of the computer program product 52, no online adaptation of the neuronal network 12 is performed. Instead, the online adaptation is performed with the aid of a simple controller, e.g. a an I- or PID-controller, merely with factor and offset, or on the basis of a characteristic map, e.g. a 3×3 characteristic map. Further, it is evident from FIG. 1 and FIG. 2 that the computer program product 52, for the modeling of the cylinder charge and for evaluation of model deviations and computation of the adaptation factors, makes use of an output value of the neuronal network 12, of a lambda control 40, a suction tube pressure controller 42 and/or of an air-mass measurement device 38.

Figure 4:
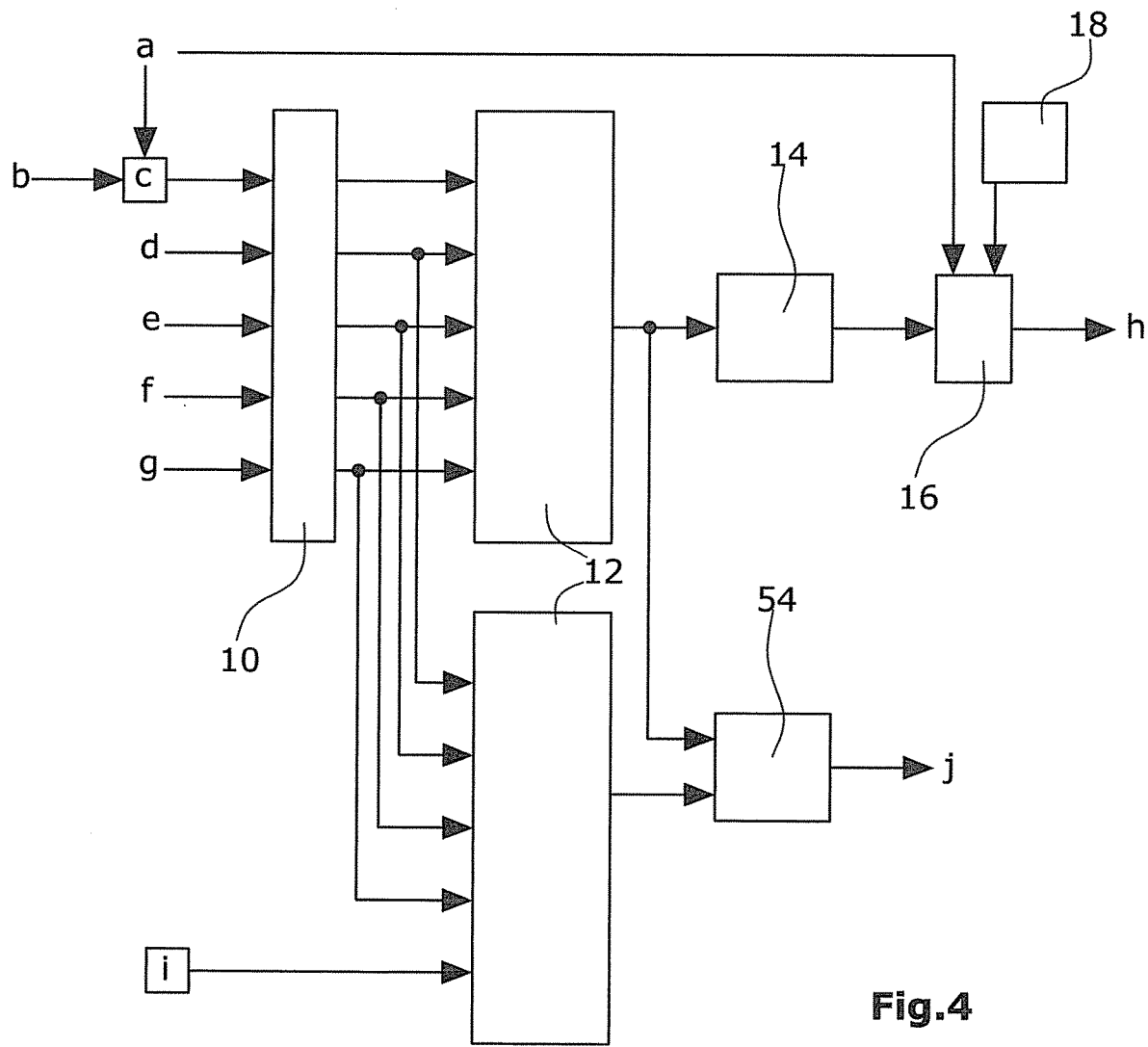

FIG. 4 shows an architecture for cylinder charge computation and for computation of an output value j. Here, the upper portion of the architecture is the same as in FIG. 1. The computation is performed in the following manner: A pressure quotient c comprises a measured pressure b and will run through the neuronal network 12, namely together with the further input values such as e.g. the rotary speed d of the internal combustion engine, the valve lift e, an inlet valve camshaft phase f and an outlet valve camshaft phase g. In the process, the further input values d, e, f and g will run through the neuronal network 12 for a first time. In this manner, a first output value is obtained. Then, the input values d, e, f and g will run through the neuronal network 12 for a second time. This is illustrated in the lower portion of FIG. 4. In addition to the input values d, e, f and g, a pressure quotient i will run through the neuronal network 12, wherein a computed pressure is used instead of a measured pressure b. Subsequently, in a module 54, a local linear regression is performed between the output value of the first run and the output value of the second run. The thus obtained output value j is a value of a residual gas pressure and/or a value of a charge portion via the suction tube pressure.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for model-based determination of a cylinder charge of a combustion chamber of an internal combustion engine, wherein the internal combustion engine has a variable valve lift which is considered in the model-based determination, comprising the steps of:
   modeling, in a computer, the cylinder charge of the combustion chamber using at least one neuronal network and inputting at least three input values into the neuronal network;
   determining a pressure quotient in a module of the computer for use as one of the at least three input values, the pressure quotient being at least indirectly determined from a pressure of the air sucked by the internal combustion engine and from an operating pressure, at least one of the other inputs selected from the group of a rotary speed of the internal combustion engine, a valve lift of the internal combustion engine, an inlet valve camshaft phase, and an outlet valve camshaft phase; and
   using the determined cylinder charge for control of the internal combustion engine.

2. The method according to claim 1, wherein in the pressure quotient, is a pressure of the air sucked by the internal combustion engine, a suction tube pressure or a charging pressure.

3. The method according to claim 1, wherein the pressure quotient includes, as a pressure of the air sucked by the internal combustion engine, a measured value, a computed value and/or a value determined from a characteristic map.

4. The method according to claim 1, comprising multiplying an output value of the neuronal network by an operating pressure and then dividing by a value characterizing a standard pressure-whereby a correction of the determined cylinder charge is performed in dependence on the geographic altitude where the internal combustion engine is located.

5. The method according to claim 1, wherein one of the at least three input values includes at least one phase of a camshaft phase, wherein use is made of an inlet valve camshaft phase and/or outlet valve camshaft phase.

6. The method according to claim 1, wherein, for correction of deviations, there is performed an adjustment of values used in the model-based determination, utilizing of values of an output value of the neuronal network, of a lambda control, of a suction tube pressure controller and/or of an air-mass measurement device.

7. The method according to claim 6, wherein an adjustment of the output value of the neuronal network is performed with the aid of values from an air-mass measurement device as soon as, both by the air-mass measurement device and the lambda control, a respective deviation is determined from the value of the cylinder charge delivered by the neuronal network.

8. The method according to claim 7, wherein an adjustment of a fuel amount is performed by the lambda control as soon as a respective deviation is determined from the value of the cylinder charge delivered by the neuronal network both by the air mass measurement device and the lambda control.

9. The method according to claim 6, wherein a respective deviation is determined from the value of the cylinder charge delivered by the neuronal network by means of the output value of the neuronal network an adjustment of a value of an air-mass measurement device is performed as soon as, by the air-mass measurement device as well as by the neuronal network as well as by the suction tube pressure controller.

10. The method according to claim 6, wherein an adjustment of a modeled throttle flap mass flow is performed by the suction tube pressure controller as soon as, both by the air-mass measurement device and the suction tube pressure controller, a respective deviation is determined from the value of the cylinder charge delivered by the neuronal network.

11. The method according to claim 1, wherein a value of an output value is computed by performing a run through the neuronal network for a first time, with a pressure quotient using a measured pressure and with further input values, and by performing a run through the neuronal network for a second time, with a pressure quotient using a computed pressure and with further input values, and, subsequently, performing a local linear regression between the output value of said first run and the output value of said second run.

12. A computer program product for an engine computer program product being loaded in an engine control, the engine control having a storage medium that comprises one or more programming instructions stored thereon for causing the engine control to control a cylinder charge for a combustion chamber, an engine having a sensor measuring a measured pressure of air sucked by the engine, the computer program product comprising:
 a neuronal network adapted to receive at least three inputs, one of the inputs being a pressure quotient determined by the ratio of the measured pressure received from the sensor by the engine control and an operating pressure, at least one of the other inputs selected from the group of a rotary speed of the internal combustion engine, a valve lift of the internal combustion engine, an inlet valve camshaft phase, and an outlet valve camshaft phase, the neuronal network further having an output a module adapted to determine the cylinder charge using the output of the neuronal network for control of the engine.

13. An internal combustion engine having a combustion chamber and a variable lift valve comprising;
 a sensor for measuring a pressure of air sucked by the engine;
 an engine control connected to the variable lift valve;
 the engine control further having a neuronal network and a module of a computer program product, the neuronal network adapted to receive at least three inputs, one of the at least three inputs being a pressure quotient determined by the ratio the measured pressure from the sensor and an operating pressure, the other inputs selected from the group of a rotary speed of the internal combustion engine, a valve lift of the internal combustion engine, an inlet valve camshaft phase, and an outlet valve camshaft, the module of the computer program product using the neuronal network to determine the cylinder charge for the combustion chamber, the determined cylinder charge is used for control of the internal combustion engine.

14. A method of controlling the cylinder charge for a combustion chamber of an internal combustion engine having a lift valve, the method comprising;
 measuring the air pressure sucked by the combustion chamber;
 determining a pressure quotient as a ratio of the measured air pressure to the operating pressure;
 inputting at least three inputs into a neuronal network, one of the inputs being the pressure quotient and at least one of the other inputs selected from the group of a rotary speed of the internal combustion engine, a valve lift of the internal combustion engine, an inlet valve camshaft phase, and an outlet valve camshaft phase to determine an output;
 using the output of the neuronal network to determine the charge for the combustion chamber; and
 using the determined charge of the combustion chamber for control of the internal combustion engine.

* * * * *